United States Patent Office 3,492,816
Patented Feb. 3, 1970

3,492,816
POWER STEERING AND LIKE CONTROLS
Frederick J. Adams, Campton, England, assignor to TRW Inc., Cleveland, Ohio, a corporation of Ohio
Filed Jan. 17, 1968, Ser. No. 698,490
Claims priority, application Great Britain, Jan. 18, 1967, 2,584/67
Int. Cl. F15b 15/18; B62d 5/08, 5/10
U.S. Cl. 60—52           5 Claims

ABSTRACT OF THE DISCLOSURE

The specification discloses a vehicle power steering system of the kind in which a torque-responsive valve controls hydraulic power assistance; in the system this is a five-chambered spool valve with permanent duct connections to the power pump and to the manual double-acting pump and to the reservoir, and preferably a check-valve in the power duct which is operable mechanically by movements of the spool either way from neutral.

---

Figure 1:
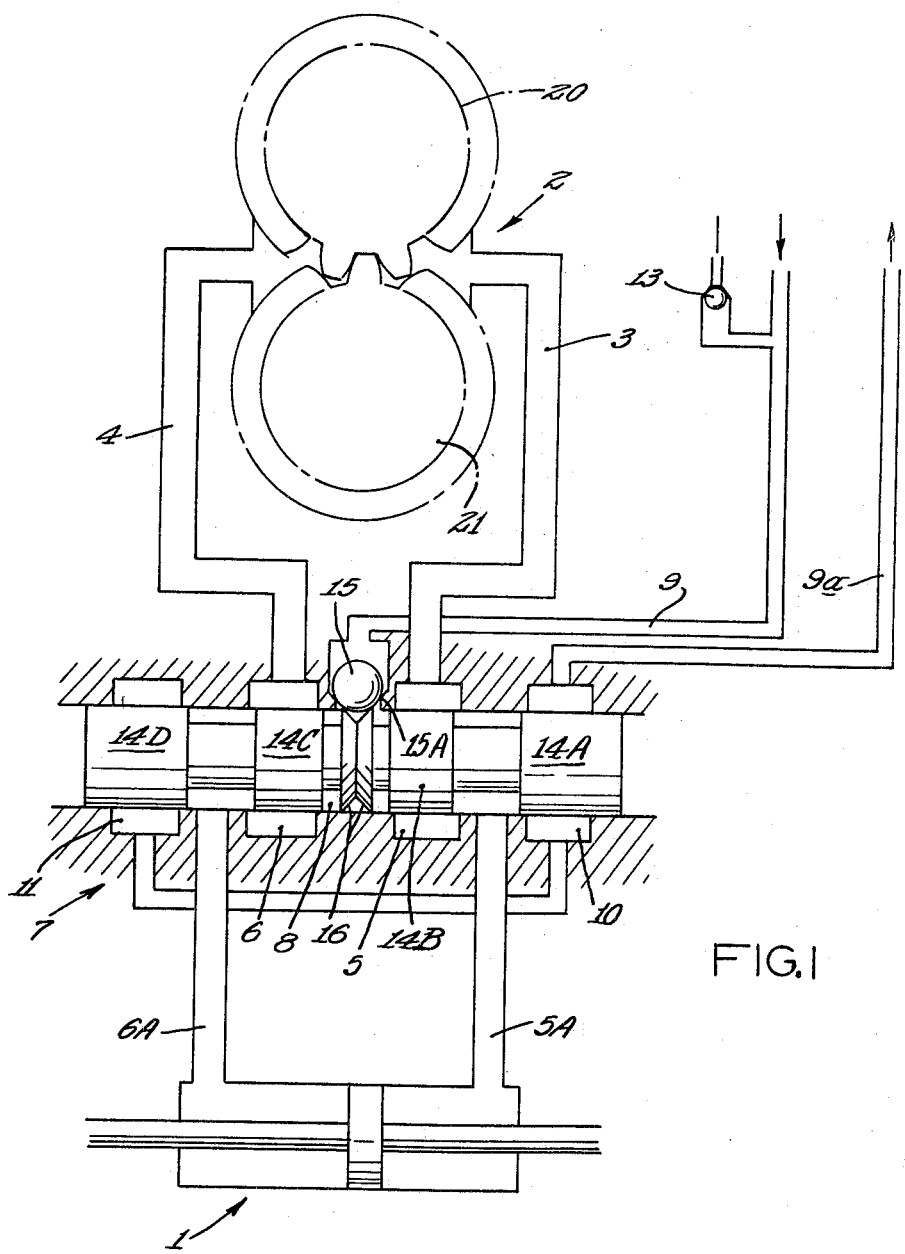

This invention relates to power assisted steering system, or systems in which, as in steering, rotation and torque imposed by an operator in one sense or the other to a steering wheel or equivalent control causes a flow of pressure fluid in corresponding sense to a double-acting servomotor. For brevity, the invention will be described herein as related to steering systems for vehicles.

The invention seeks to provide a system of considerable simplicity, with adequate sensitivity, ability to give "feel," ability to afford non-assisted operation, and other desirable design and economic features.

The invention is concerned with power vehicle steering or like systems of the kind in which there is a fluid-pressure power sourse (e.g. an engine-driven pump) and a reversible rotary manual pump, and the torque applied to the manual pump operates a spool valve which by sense of movement and effective opening determines the sense and pressure or rate of fluid flow to a double-acting servomotor. Like systems are those in which the operation of a control involves similar problems to those of vehicle systems. The term "spool valve," though primarily descriptive of a valve having a linearly-moving element in a generally cylindrical body, may extend to rotary valves of land-and-groove kind of which the hydraulic effect is the same as in the linear case. Such a system is of the kind described and claimed.

According to the invention, there is provided a power vehicle-steering system of the kind specified, comprising a five-chamber spool valve operated as to sense of direction and effective opening in accordance with the sense and magnitude of manual effort, in which the valve centre chamber is supplied by the power-source, the inner end valve chambers are permanently in communication with the two sides of a double-acting servomotor and with the two sides of the manual pump, and the outer end chambers are in permanent intercommunication all so that force and movement in proportion to the manual effort in one (or the other) sense of direction operates the valve so as to open the centre chamber to a corresponding inner chamber (and thereby to one side of the manual pump) simultaneously to open the other inner chamber to one side of the servomotor (and thereby to the other side of the manual pump) and simultaneously to open that outer end chamber which is already open to the alternative side of the servomotor, to the reservoir, both outer end chambers being permanently open to the reservoir.

In such a system, there is preferably included a check-valve which is mechanically operated by the moving member of the spool valve, of which the function and preferred form will become clear by the following description.

Further, the invention includes in a system of the kind described, a spool valve so arranged that, in its neutral position, the two sides of the servomotor are in communication with the two sides of the manual pump whereby manual forces which are of low torque will be fluid-applied in the servomotor without effective movement of the spool and consequently without recourse to power.

The invention assumes to be applied to known practices whereby the variations of force applied manually by the operator are reflected in sense of direction and magnitude in operative movements of a spool valve. Devices to accomplish this are exemplified by the type of steering gear in which a torsion-bar is arranged to transmit steering torque, and the deflections between its ends occasioned by torsional strains operate valve means which control pressure fluid for power assistance.

Figure 2:
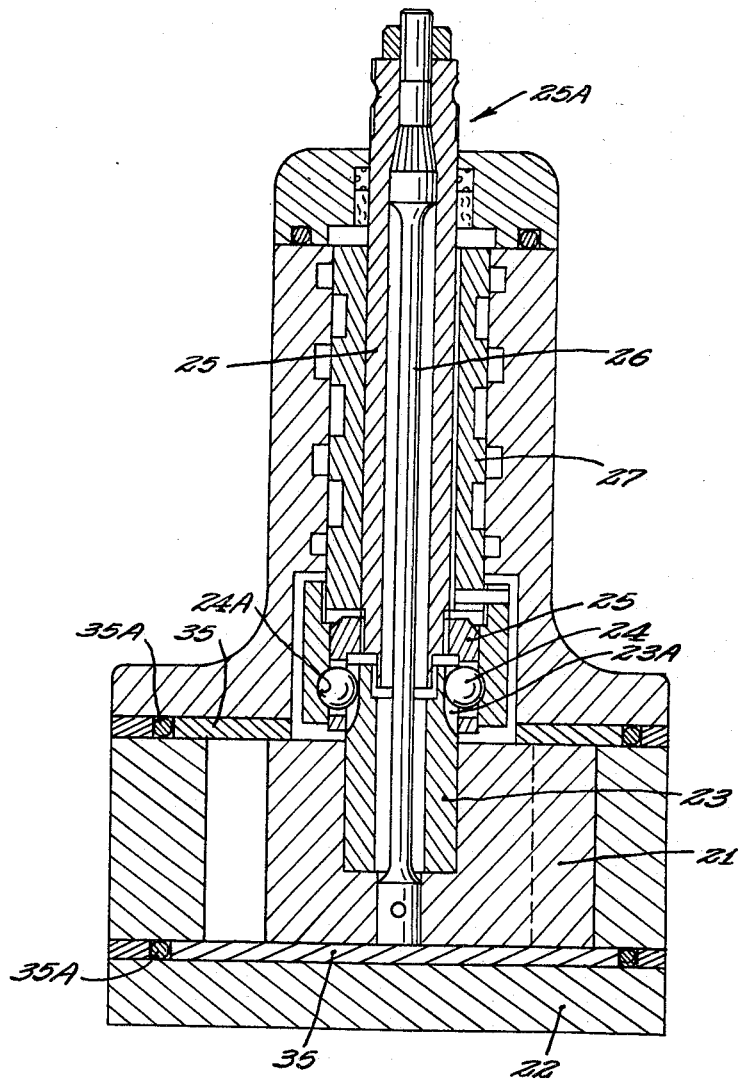

In the following description it is to be assumed that the torque applied manually to the manual pump, results in movement of the spool valve in its body. The relevant ingredients of a vehicle steering system according to the invention in its preferred form, will now be described with reference to the accompanying drawing in which:

FIGURE 1 is a diagrammatic illustration of hydraulic circuitry according to the invention and FIGURE 2 illustrates in section a torque-responsive spool valve in relation to part of a manual gear pump such as is represented by 3 of FIG. 1. This figure represents one example of the type of torque-responsive valve mentioned above as being in the known practice.

The vehicle steering system of the drawings has a double-acting hydraulic servomotor generally indicated at 1, movements of which control the steering road-wheels of the vehicle. A manual gear pump indicated at 2 has two ports connected to ducts 3 and 4. The ducts 3, 4, run to two inner valve chambers 5 and 6 in the body of a spool valve generally shown at 7. This valve has a centre chamber 8, which is permanently supplied with pressure fluid by pressure line 9 from a hydraulic power pump or source (not shown), which will usually be an engine driven pump supplied by a reservoir (not shown). Outer end chambers 10, 11, of the valve 7 are permanently connected to the reservoir; a topping-up duct with a non-return valve as at 13 is connected to line 9 and can supply fluid thereto from the reservoir.

The spool has four lands 14A, 14B, 14C, 14D, providing control edges to outer end chamber 10, inner chambers 5, 6, and outer end chamber 11 respectively. The lands 14B and 14C intrude in the centre chamber 8, thus containing the pressure fluid in duct 9. The lands 14A and 14D overlap into the outer end chambers 11 and 10, thus isolating ducts 5A and 6A from the return duct to reservoir. The outer control edges of lands 14B and 14C are arranged to permit fluid from ducts 3 and 4 to ducts 5A and 6A, and vica versa. Thus, with no spool movement (spool neutral) the manual pump will draw from one side of the servomotor 1, and feed the other side of the servomotor, so providing a direct fluid steering control, and feed back the road wheels is transmitted to the driver of the vehicle.

If there is no assistance pressure available, further input effort at the steering wheel will move the spool, thus opening further the control edge at land 14C into chamber 6, thus improving fluid flow from duct 4 to duct 6A. At the same time, the control edge at land 14B will connect chambers 5 and 8, thus permitting duct 3 to draw from reservoir duct 9 through non-return valve 13. Simultaneously, the control edge at 14A opens to connect duct 5A to chamber 10 and thence to reservoir. Fluid steering control is thus maintained.

Now assume, as is normally the case, that pressure is available in pipe 9. When the spool is moved as above. pressure fluid will pass by duct 3 to the pump 2 and this pressure either assists the user to operate the pump, or equals his effort (in which case the pump 2 acts in effect as a meter) or actually impels the pump now acting as a motor. In any of these cases the system affords what is generally known as power assistance.

In FIGURE 1 (but not in FIG. 2) is illustrated in principle a check valve, in the form of a valve ball 15 seating at 15A to prevent flow into the centre chamber 8 from the line 9. The ball 15 is so located that it is unseated by one or other of two opposed frustoconical flanges which are part of the valve spool, when the valve spool moves from its neutral position. This check valve prevents flow from the pressure source if there is leakage past the lands 14B or 14C when the valve spool is in neutral position. It follows that these lands may be arranged either with open or closed centre.

It is seldom desirable to have a system in which the power can overrun the user's action. It is therefore proposed in this system to control the supply of pressure fluid as a function of the torque applied by the user. Taking FIGS. 1 and 2, the pump is seen to have a pair of spur wheels 20, 21 in a casing 22 (into which the ducts 3 and 4 connect as indicated). The wheel 21 is mounted rigidly on a coaxial boss 23 having helical grooves 23A in which seat balls 24 caged by the end part of a sleeve 25 which is rotated by its rigid connection at its outer end, in the region 25A, to the steering column. A torque (torsionally elastic) bar 26 connects the wheel 21 to the steering column. When manual torque is applied sleeve 25 rotates slightly, relatively to boss 23; the balls 24 consequently move in the direction of the axis of the wheel 21 and, by their engagement in an annular groove, they shift the spool 27 of the spool valve (generally shown at 7 of FIG. 1) axially. This torsionally-responding coupling therefore senses the magnitude and the sense of the torque applied by the user, and the valve of which 27 is the spool (i.e. having the lands 14A to 14D of FIG. 1) is used to control the rate and the sense of flow of the pressure fluid.

What I claim is:

1. Power vehicle-steering system of the kind specified, having in combination, a five-chamber spool valve with a centre chamber, inner end chambers on both sides of the centre chamber, and outer end chambers beyond each inner end chamber, means for operating said valve as to sense and direction and effective opening in accordance with the sense and magnitude of manually applied steering torque, a source of pressure fluid including a reservoir, duct means to supply pressure fluid from said source to the centre chamber of said valve, a double-acting hydraulic servomotor, a double-acting manually operable pump, duct means permanently connecting the inner end valve chambers to the two sides of said servomotor and to the two sides of said double acting pump, duct means permanently interconnecting the outer end valve chambers, and duct means connecting the outer end valve chambers to said reservoir.

2. System according to claim 1 further provided with a check valve operative between the fluid source and said centre chamber; and means actuated by movement of the spool valve in either sense of direction from a neutral position to mechanically open said check valve.

3. System according to claim 1 with spool-operating means resiliently sensitive to the manually applied steering torque as to sense and magnitude.

4. System according to claim 2 in which the spool valve comprises a linearly-moving spool element in a basically cylindrically-bored body; a double acting cam formation carried by said spool element; a ball check-valve riding against said cam formation so as to be unseated thereby when the spool moves in either sense of direction.

5. The power steering system of claim 1 wherein the spool valve is hollow, the manually operable pump is driven by a steering wheel, a torsion rod extending through the hollow spool valve drivingly connects the steering wheel and manually operable pump, and means are provided which are actuated by torsional strain in said rod to communicate said duct means for actuating said servomotor with fluid from said source.

References Cited

UNITED STATES PATENTS

| | | |
|---|---|---|
| 2,020,951 | 11/1935 | Lemon. |
| 2,414,451 | 1/1947 | Christensen _____ 60—54.5 XR |
| 2,968,316 | 1/1961 | Schultz. |
| 3,159,084 | 12/1964 | Zeigler et al. _____ 91—368 |
| 3,246,472 | 4/1966 | Kries. |
| 3,358,711 | 12/1967 | Pruvot. |

EDGAR W. GEOGHEGAN, Primary Examiner

U.S. Cl. X.R.

91—375, 448; 137—625.69

UNITED STATES PATENT OFFICE
CERTIFICATE OF CORRECTION

Patent No. 3,492,816     Dated February 3, 1970

Inventor(s) Frederick John Adams

It is certified that error appears in the above-identified patent and that said Letters Patent are hereby corrected as shown below:

TRW Inc. assignee should be --Cam Gears Limited--

Recorded - October 14, 1969
    Reel - 2540
    Frame - 790

SIGNED AND SEALED
JUL 14 1970

(SEAL)
Attest:

Edward M. Fletcher, Jr.
Attesting Officer

WILLIAM E. SCHUYLER, JR.
Commissioner of Patents